United States Patent

Iwasaki et al.

[11] Patent Number: 5,892,550
[45] Date of Patent: Apr. 6, 1999

[54] TELEVISION SIGNAL CONVERSION SYSTEM AND IMAGE ENCODING AND DECODING SYSTEM

[75] Inventors: Eiji Iwasaki, Yawata; Shinichi Kawakami, Moriguchi; Masahiro Honjo, Sakai, all of Japan

[73] Assignee: Matsushita Electric Industrial Co., Ltd., Osaka, Japan

[21] Appl. No.: 652,760

[22] Filed: May 23, 1996

[30] Foreign Application Priority Data

Jun. 8, 1995 [JP] Japan ..................................... 7-141530
Mar. 27, 1996 [JP] Japan ..................................... 8-072688

[51] Int. Cl.⁶ ..................................................... H04N 7/01
[52] U.S. Cl. ........................................... 348/443; 348/452
[58] Field of Search ..................................... 348/384, 401, 348/443, 452, 526, 570, 622, 666

[56] References Cited

U.S. PATENT DOCUMENTS

| | | | |
|---|---|---|---|
| 4,635,120 | 1/1987 | Ichonoi ................................... | 348/622 |
| 5,255,091 | 10/1993 | Lyon et al. .............................. | 348/443 |
| 5,260,787 | 11/1993 | Capitant et al. ........................ | 348/459 |
| 5,317,398 | 5/1994 | Casavant et al. ....................... | 348/570 |
| 5,333,054 | 7/1994 | Tanaka et al. .......................... | 348/666 |
| 5,365,273 | 11/1994 | Correa et al. ........................... | 348/452 |
| 5,389,978 | 2/1995 | Jeong-Hun .............................. | 348/622 |
| 5,452,011 | 9/1995 | Martin et al. ........................... | 348/526 |
| 5,461,420 | 10/1995 | Yonemitsu et al. ..................... | 348/401 |
| 5,563,660 | 10/1996 | Tsukagoshi ............................. | 348/384 |

FOREIGN PATENT DOCUMENTS 6-30332A 2/1994 Japan .
7-99603A 4/1995 Japan .

OTHER PUBLICATIONS

Eiji Iwasaki, et al; "A Study on Preprocessing of MPEG2 Video Coding for Telecine Source"; Jul. 26, 1995; ITE '95, 1995 ITE Annual Convention; pp. 129–130.

*Primary Examiner*—Bryan Tung
*Attorney, Agent, or Firm*—Stevens, Davis, Miller & Mosher, L.L.P.

[57] ABSTRACT

In this invention, the duplicate field included in a telecine signal that is produced from a movie film or the like by 2–3 pull down system is detected without failure, and completely removed before being encoded or transmitted. The result of the accumulation of the duplicate field in the telecine signal is regarded as an amount of noise resulting from the conversion of a film into the telecine signal. Then, a threshold is used as a reference for detecting the duplicate field and changed in accordance with the noise. In addition, a memory is provided to store the location of the duplicate field in the telecine signal, thus making it possible to surely eliminate the duplicate field at the same location even when the same video signal is received again.

43 Claims, 13 Drawing Sheets

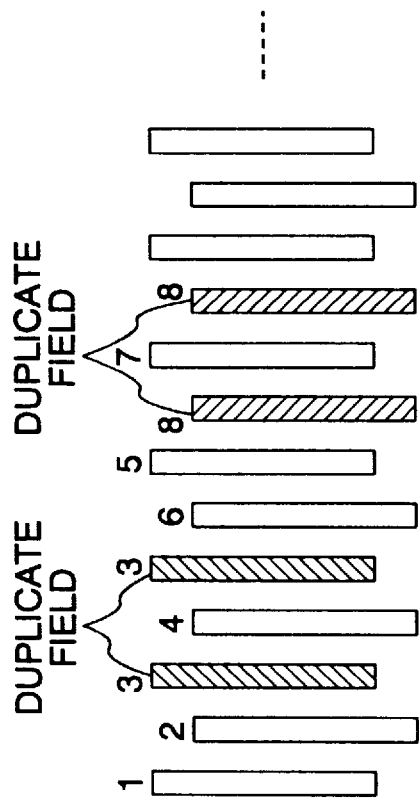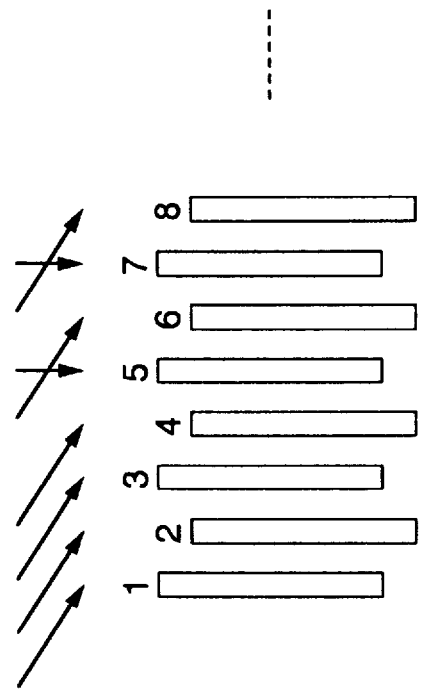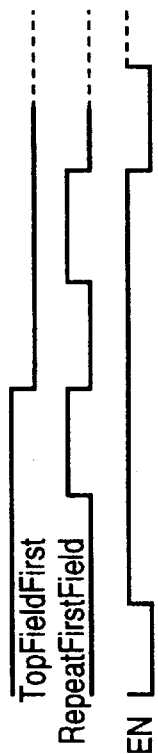
FIG. 5A TELECINE (30Hz)
FIG. 5B CONVERTED OUTPUT (30Hz)
FIG. 5C CONTROL SIGNAL OUTPUT

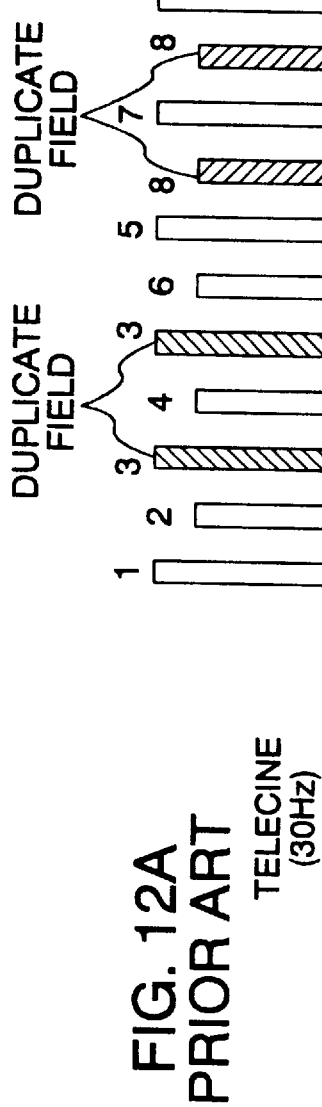
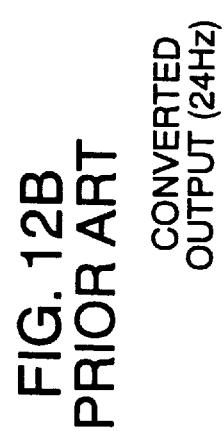
FIG. 12A PRIOR ART TELECINE (30Hz)
FIG. 12B PRIOR ART CONVERTED OUTPUT (24Hz)
FIG. 12C PRIOR ART CONTROL SIGNAL OUTPUT

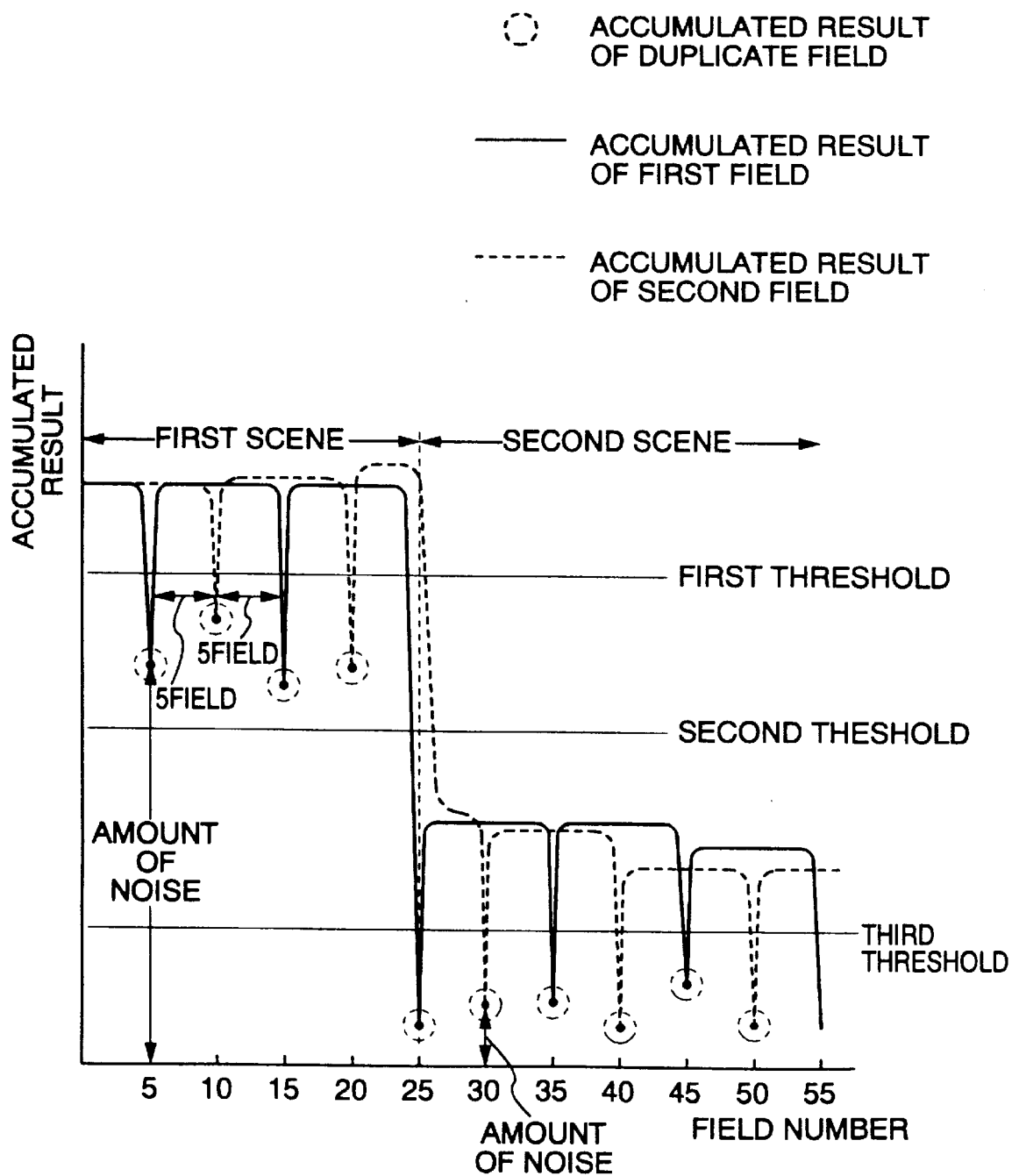

TELEVISION SIGNAL CONVERSION SYSTEM AND IMAGE ENCODING AND DECODING SYSTEM

BACKGROUND OF THE INVENTION

This invention relates to a television signal conversion system for removing redundant fields from a video signal that is produced from a movie film by a 2–3 pull down system or the like, an image encoding system for encoding the video signal, and an image decoding system for decoding the encoded data.

A method of compressing and encoding long-time video signals and recording them on storage media has been examined with the development of digital storage media. The MPEG (moving picture image coding expert group) of the international electric standard conference in the international standard organization (ISO) has been in operation toward the standardization of the moving picture compression and encoding system.

The video signal can be considered to include the following two types. One is a television signal of 30 frames of image per second (NTSC system), and the other is a film of 24 frames of image per second. The 2–3 pull down system is known as a system for converting the frame number of a film into that of a television signal (NTSC).

FIG. 10 shows the principle of the widely used 2–3 pull down system.

The first frame of a film is converted into the first and second fields. The second frame of the film is converted into the third, fourth and fifth fields. The third frame is converted into the sixth and seventh fields. The fourth frame is converted into the eighth, ninth and tenth fields. Thus, such conversions are repeated, resulting in the conversion of the film into a television signal (NTSC system). The video signal resulting from conversing a film into a television signal is called "telecine signal".

The telecine signal obtained by the 2–3 pull down system periodically includes duplicate fields, or redundant fields as will be seen from FIG. 10. In FIG. 10, the third and fifth fields are just the same field (the latter one is the duplicate field), and the eighth and tenth fields are also just the same field (the latter one is the duplicate field).

Therefore, if the telecine signal produced by 2–3 pull down system is directly compressed and encoded, the redundant, duplicate fields are also compressed and encoded. Thus, when the video signal to be compressed and encoded is a telecine signal, the duplicate fields are eliminated from the telecine signal before the compression and encoding process, and then the encoding or transmitting means is used.

FIG. 11 shows the conventional system for detecting and eliminating the duplicate fields of the telecine signal produced by converting a film into a television signal as described above.

Referring to FIG. 11, there are shown an input terminal 10 of the system, a control signal output terminal 20 for outputting a control signal according to the telecine image, and an output terminal 30 of the system. In addition, there are shown a frame memory 100, a subtracter 200, an absolute value circuit 300, an accumulator 400 for producing an accumulated result per field, a comparator 500 for producing results of comparison to a threshold, a hold circuit 600 for holding data for one-field period, and a control signal generator 700 for generating the control signal according to the telecine image. Moreover, there are shown a write control circuit 800 for controlling a memory 900 to write, a read control circuit 850 for controlling the memory 900 to read, and the frame memory 900 for storing the video signal. The operation of the conventional television conversion system constructed as above will be described with reference to FIG. 11.

The telecine signal fed through the input terminal 10 of the system is directly supplied to the subtracter 200 and also to the frame memory 100, by which it is delayed one frame. The delayed signal is supplied to the subtracter 200, where an interframe difference signal is produced. The interframe difference signal is supplied to the absolute value circuit 300 where its absolute value is produced, and then the absolute value is accumulated for each field unit by the accumulator 400. The accumulated result is supplied to the comparator 500, where it is compared with a threshold. If the accumulated result is larger than the threshold, it is decided that the current field is of a different frame of the original film from the frame of the one-frame preceding field. If the result is smaller than the threshold, it is decided that the current field is of the same frame of the original film as the frame of the one-frame preceding field, that is, the duplicate field. The result of the comparison to the threshold is held in the hold circuit 600 for one-field period, and supplied to the control signal generator 700, which then generates the control signal corresponding to the telecine image. The frame memory 900 prevents the duplicate fields from being fed to the next stage. That is, the frame memory 900 converts the telecine image (30 Hz) into the frame rate of the film image (24 Hz) and feeds it to the output terminal 30 of the system. The write control circuit 800 controls the frame memory 900 to write, and the read control circuit 850 controls the frame memory 900 to read in accordance with the control signal fed from the control signal generator 700.

FIG. 12 shows the video signal conversion operation of the frame memory 900 illustrated in FIG. 11. The conversion operation for the telecine signal will be described with reference to FIG. 12. The telecine signal fed through the input terminal 10 as shown in FIG. 11 is passed through the memory 900 to the output terminal of the system in the order of successive fields (fields 1, 2, 3, 4 shown in FIG. 12A) until a duplicate field is detected. When a duplicate field is detected as shown in FIG. 12A at the latter one of the fields "3", this duplicate field is not transmitted, but the following fields (fields 6, 5, 8, 7 shown in FIG. 12A) are supplied to the output terminal. The control signal generator 700 generates a flag indicative of whether a duplicate field is detected or not (for example, RepeatFirstField in MPEG2 standard) and supplies it to the next stage.

Thus, the television signal conversion system constructed as above removes the duplicate fields from the telecine signal, and as a result produces at the output terminal 30 the video signal of film rate (24 Hz) with the duplicate fields removed as shown in FIG. 12B. Also, the control signal associated with the output video signal with the duplicate fields removed is produced from the output terminal 20 in synchronism with the output video signal as shown in FIG. 12C.

However, the conventional method for detecting the duplicate fields has the following problems.

(1) The noise included in the telecine signal has a large effect. This is because the result from the accumulator 400 is increased over a threshold by much noise included in the telecine signal, with a result that the field normally decided as a duplicate field may be regarded as being not a duplicate, or that the duplicate fields sometimes cannot be completely detected.

The problem (1) will be described in detail with reference to FIG. 13.

FIG. 13 is a graph of the output of the accumulator 400 in FIG. 11 as the ordinate with respect to the field count as the abscissa, with a certain telecine signal being supplied to the input terminal. Since the telecine signal produced as a result of conversion by 2–3 pull down system periodically includes duplicate fields as previously described, the output result from the accumulator 400 periodically decreases in accordance with the duplications.

As illustrated in FIG. 13, when a sequence (first scene) of the telecine signal including much noise and another sequence (second scene) of the telecine signal including less noise are continuously supplied, the following troubles are caused when the duplicate fields are tried to be detected by the conventional method. The duplicate fields in the first scene can be completely detected by comparing the result from the accumulator 400 to a first threshold, but all the fields in the second scene are regarded as duplicate fields since the result from the accumulator 400 is always smaller than the first threshold. In addition, if the result from the accumulator 400 is compared with a second threshold, the duplicate fields in the first scene cannot be detected at all, and all the fields in the second scene are decided to be duplicate fields. If the result from the accumulator 400 is compared with a third threshold, the duplicate fields in the first scene cannot be detected at all, but the duplicate fields in the second scene can be completely detected. In that case, the first to third thresholds are supplied to one input end of the comparator 500 in FIG. 11. Therefore, the duplicate fields in the telecine signal sometimes cannot be completely detected by the conventional method.

(2) There is a variable length coding method in which temporary encoding is first made for determining parameters for real encoding and then the real encoding is made. In this method, the duplicate fields detected and removed at the time of temporary encoding are required to coincide with those to be removed upon real encoding. If both are not coincident, the parameters for real encoding, determined at the time of temporary encoding are different from those in the real encoding.

On the other hand, if the telecine signal is reproduced from, for example, a recording medium on a VTR and supplied to the system, noise is sometimes caused in the telecine signal reproduced from the recording medium. At this time, even though the same telecine signal is tried to reproduce from the same recording medium in both temporary and real encoding operations, different telecine signals will be reproduced because of the inclusion of noise. Thus, the result of detecting the duplicate fields at the time of temporary encoding is sometimes different from that at the time of real encoding. Accordingly, the parameters in the following encoding means differ from those determined at the time of temporary encoding, with the result that the picture quality is considerably deteriorated upon decoding.

(3) Since each duplicate field is eliminated immediately after being detected, the fields of the television signal cannot be kept continuous each time a duplicate field is detected. Thus, when the fields which are close to the current field are tried to be processed on the basis of the frame unit according to MPEG2 standard or the like, the switching between even and odd fields will need the change of the processing order, making the processing complicated.

(4) The telecine signal is supplied at the frame rate of 30 Hz, while the converted signal has the frame rate of 24 Hz. Thus, different reference clocks must be separately provided for both the input telecine signal and the converted output signal or for the next stage, making the circuit operations unstable.

In addition, since this system always detects whether the current field is duplicate or not, once missing of, for example, this detection, due to noise or the like will result in successive detection of only even or odd duplicate fields. Thus, if the system employs the frame-unit processing of television signals as in the MPEG2 standard, the successive odd or even fields cannot be processed on the frame-unit basis, with the result that the encoding or transmission processing cannot be performed.

The above difficulties will be caused by the following factors.

(5) When the telecine images are directly edited by VTR or the like, the edited images have irregular conversion patterns unlike those shown in FIG. 12, or even or odd duplicate fields are sometimes successively detected. As a result, only even or odd fields are successively transmitted, and thus cannot be processed on the frame-unit basis according to MPEG2 standard.

(6) When the telecine images have successive frames of still images, the system always decides that the successive frames are a succession of duplicate fields. Thus, when the control flags (TopFieldFirst and RepeatFirstField) in the MPEG2 standard are used, the pattern cannot be controlled so that the encoding or transmission cannot be continuously performed.

(7) If the telecine signal having much noise is supplied to the system that uses a fixed threshold for determining whether the current field is duplicate or not, the difference value between frames having much noise is always larger than this threshold, so that the fields of those frames are always decided to be independent fields. Thus, since the duplicate fields cannot be completely detected and removed, the efficiency of the encoding or transmission can be increased.

(8) Moreover, when the telecine signal and the normal television signal (frame rate of 30 Hz) are mixed and have noise components changed, discrimination cannot be made between the actual change of the frame rate and the effect of noise on the decision of whether the current field is duplicate or not. Thus, when a duplicate field is decided to be an independent field by mistake, the amount of information to be transmitted to the next stage becomes redundant. If an independent field is decided to be a duplicate field by mistake, the picture quality is greatly deteriorated.

SUMMARY OF THE INVENTION

It is an object of the invention to provide a television signal conversion system capable of (1) correctly detecting and removing the duplicate fields even when the amount of noise caused in the telecine signal upon conversion is changed, and capable of (2) detecting and removing the same duplicate fields at the time of both temporary and real encoding operations.

It is another object of the invention to provide a television signal conversion system capable of (3) holding the continuity of the fields of the television signal even when the duplicate fields are detected and removed, and capable of (4) processing both the reference clock of the input telecine signal and the reference clock of the converted output signal at the same clock.

It is still another object of the invention to provide a television signal conversion system capable of stably detecting duplicate fields and independent fields and making the compression or transmission of the video signal at high efficiency on the basis of MPEG2 standard even when (5) the conversion patterns are irregular, (6) the telecine images include still images, (7) the telecine signal having much noise is supplied to the system, and (8) the telecine images having originally different frame rates are supplied to the system.

In order to achieve the object according to item (1), the accumulated result of a duplicate field is assumed to be an amount of noise, a certain threshold is determined as a reference for detecting whether the current field is duplicate or not according to the amount of noise, and the threshold is changed each time a duplicate field is detected.

In order to achieve the object according to item (2), when a sequence of a telecine signal is supplied, duplicate field identification information is stored in a storage unit such as a memory, while when another sequence of the same telecine signal is again supplied, the duplicate fields are removed by use of the duplicate field identification information stored in the memory.

In order to achieve the object according to item (3), when a duplicate field is detected on the first field side, it is removed, and an offset of one-frame period is given to the first field side. Then, when a duplicate field is detected on the second field side, it is removed, and the offset of one-frame period given to the first field is removed.

In order to achieve the object according to item (4), both the input telecine signal and the converted output signal are operated at a frame rate of 30 Hz, and when one or more duplicate fields are detected on the first and second field sides, the output to the following stage is cut off and the duplicate fields are removed, so that processes in the following stages are stopped during the data-lacking period of time.

In order to achieve the object according to item (5), the duplicate field detecting means is constructed to have means for switching between even field detection and odd field detection so that a duplication can be detected at alternate even and odd fields. When a duplication is detected on each of the even field side and odd field side, the transmission or encoding in the following stage is stopped during one-frame period.

In order to achieve the object according to item (6), it is considered that duplications are regularly detected in the regular conversion pattern but always detected in the still pictures. The duplicate field detecting means is constructed to have means for inhibiting the detection of duplicate fields so that when a duplicate field is detected, detection operation for duplicate fields is inhibited during the period in which independent fields originally succeed the detected duplicate field (4-field period when 2–3 pull down system is used).

In order to achieve the object according to item (7), means by which the threshold of the duplicate field detecting means can be controlled is provided to change the threshold according to the magnitude of the noise component of the television signal. The means for detecting the magnitude of the noise of the television signal is constructed to (a) calculate the average value of the luminance component of the television signal, considering that the telecine signal has the more noise component when the darker scene is photographed, or to (b) detect the change of the interframe difference value decided to indicate a duplicate field, considering that the interframe difference value decided to indicate a duplicate field is increased with the increase of noise.

In order to achieve the object according to item (8), it is considered that a duplicate field is sure to appear at every five fields when a film (24 Hz) is regularly converted into a telecine signal (30 Hz). A field-period counter capable of measuring the interval at which a duplicate field appears, and a counter capable of measuring the number of times that duplicate fields successively appear with a 5-field period, are provided so that the result of duplicate-field detection is not effective until the detection of a certain number of duplicate fields appearing with a 5-field period.

Thus, according to the television signal conversion system, (1) by changing the threshold as a discrimination reference for detecting whether there is a duplicate field on the basis of the amount of noise that is caused when a film is converted into a telecine signal, it is possible to more completely detect the duplicate fields than in the prior art in which fixed thresholds are used.

Also, (2) by storing the duplicate field identification result in a memory, it is possible to surely eliminate duplicate fields at the same locations without the effect of noise caused on a recording medium or transmission medium even when the same video signal is again supplied to the input terminal.

(3) By using the means for giving an offset of one-frame period to one field side or removing it according to the result of duplicate field detection, it is possible to maintain the continuity of the fields of the television signal even when the duplicate fields are removed.

(4) By cutting off the output data during one-frame period when a duplicate field is detected and removed at each of one field side and the other field side of the frames, it is possible to use a single clock for the operation of the system which is synchronized with the input telecine signal.

(5) By providing the means for switching between even field detection and odd field detection in the duplicate field detecting means, it is possible to detect a duplication at alternate even and odd fields. Also, when a duplicate field is detected on each of the even field side and odd field side, the output to the following stage is inhibited during one-frame period. Thus, even when the telecine image includes an irregular conversion pattern, the encoding or transmission processing can always be performed on one-frame unit basis.

(6) By constructing the duplicate field detecting means to inhibit the detection of duplicate fields only during the successive independent fields in an usual regular conversion pattern once a duplicate field is detected, it is possible to maintain, even when the telecine image includes frames of still images, the conversion pattern can be made continuous at around the frames of still images so that the encoding or transmission can be carried out with high efficiency.

(7) By detecting the magnitude of the noise component of the telecine image from the average value of the luminance signal of the telecine image or the interframe difference value at the field decided to indicate a duplicate field, and changing the threshold of the duplicate field detecting means according to this result of detection, it is possible to automatically change the threshold, even when the input telecine image includes much noise, to a higher value to decrease the detection sensitivity, and therefore to completely detect the duplicate fields without the effect of noise so that the encoding or transmission can be performed with high efficiency.

(8) By keeping the detection result not effective until a certain number, or more of duplicate fields are successively detected at intervals of a 5-field period, it is possible not to, even if an independent field is detected as a duplicate field by mistake when affected by a change such as noise, immediately inhibit the duplicate field from being fed to the following stage, but to decide to inhibit according to the periodicity. Thus, the transmission or encoding can be performed without loosing the information of independent fields, and the effect of noise or the like can be reduced.

Thus, according to the television signal conversion system of the invention, the system can be operated on a single clock signal and to always produce data of frame units, and can be connected directly to the apparatus for processing at every fields on a frame-unit basis according to MPEG2 standard or the like.

Moreover, according to the present invention, there are provided a high-efficiency image encoding system to which a 30-Hz television signal obtained by telecine conversion from a movie film or the like can be supplied as an input signal source, and a high-efficiency decoding system associated with the encoding system.

BRIEF DESCRIPTION OF THE DRAWINGS

FIGS. 5A to 5C are a timing diagram showing the operation of each portion of the third embodiment of the television signal conversion system of the invention illustrated in FIG. 4.

FIGS. 12A to 12C are a timing diagram showing the operation of each portion of the conventional television signal conversion system illustrated in FIG. 11.

FIG. 13 is a diagram to which reference is made in explaining the operation of the conventional television signal conversion system for detecting duplicate fields.

DESCRIPTION OF THE PREFERRED EMBODIMENTS

Embodiments of a television signal conversion system according to the present invention will be described with reference to the accompanying drawings. In the embodiments which will be given below, although an NTSC-system television signal produced as a result of conversion by the 2–3 pull down system is particularly used as a telecine signal, this invention is not limited to this signal, but may use any signal as long as it is an input television signal with duplicate fields inserted. Therefore, even if the number of scanning lines and the frame rate of a signal are different from those in the embodiments as in the PAL signal or high definition television signal, the signal can be easily applied to the present invention. In addition, although the respective processes in the embodiments will be described as circuit blocks in order that the readers can easily understand those descriptions, the method according to this invention can be described in programs so as to be executed with ease by use of a microcomputer, a digital signal processor (DSP) and so on.

Figure 1:
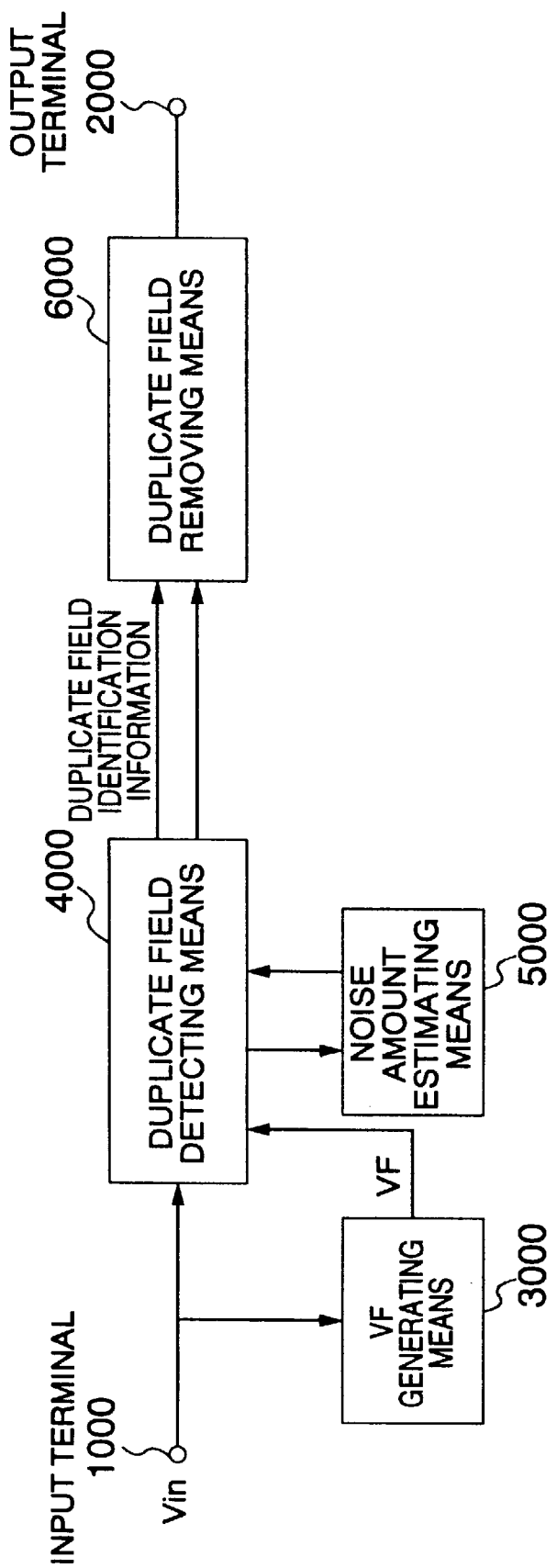
FIG. 1 is a block diagram of the first embodiment of a television signal conversion system according to the present invention.

FIG. 1 is a block diagram of a television signal conversion system of the first embodiment of the invention associated with the object (1). Referring to FIG. 1, there are shown an input terminal 1000 and an output terminal 2000, a VF generating means 3000 for generating a field alternating signal (VF) indicating whether a telecine signal fed through the input terminal 1000 is now in an odd field or in an even field, duplicate field detecting means 4000 for detecting a duplicate field, noise amount estimating means 5000, and duplicate field removing means 6000. The operation of this first embodiment of the invention will be mentioned below.

The telecine signal (Vin) fed through the input terminal 1000 is supplied to and detected in its duplicate fields by the duplicate field detecting means 4000. Thus, the duplicate field detecting means 4000 produces duplicate field identification information. The telecine signal is also delayed one frame by the duplicate field detecting means 4000, and then fed to the duplicate field removing means 6000. The duplicate field identification information produced from the duplicate field detecting means 4000 controls the duplicate field removing means 6000 to remove the duplicate fields from the telecine signal that is fed to the duplicate removing means 6000. Thus, the telecine signal with the duplicate fields removed is outputted from the output terminal 2000.

Figure 2:
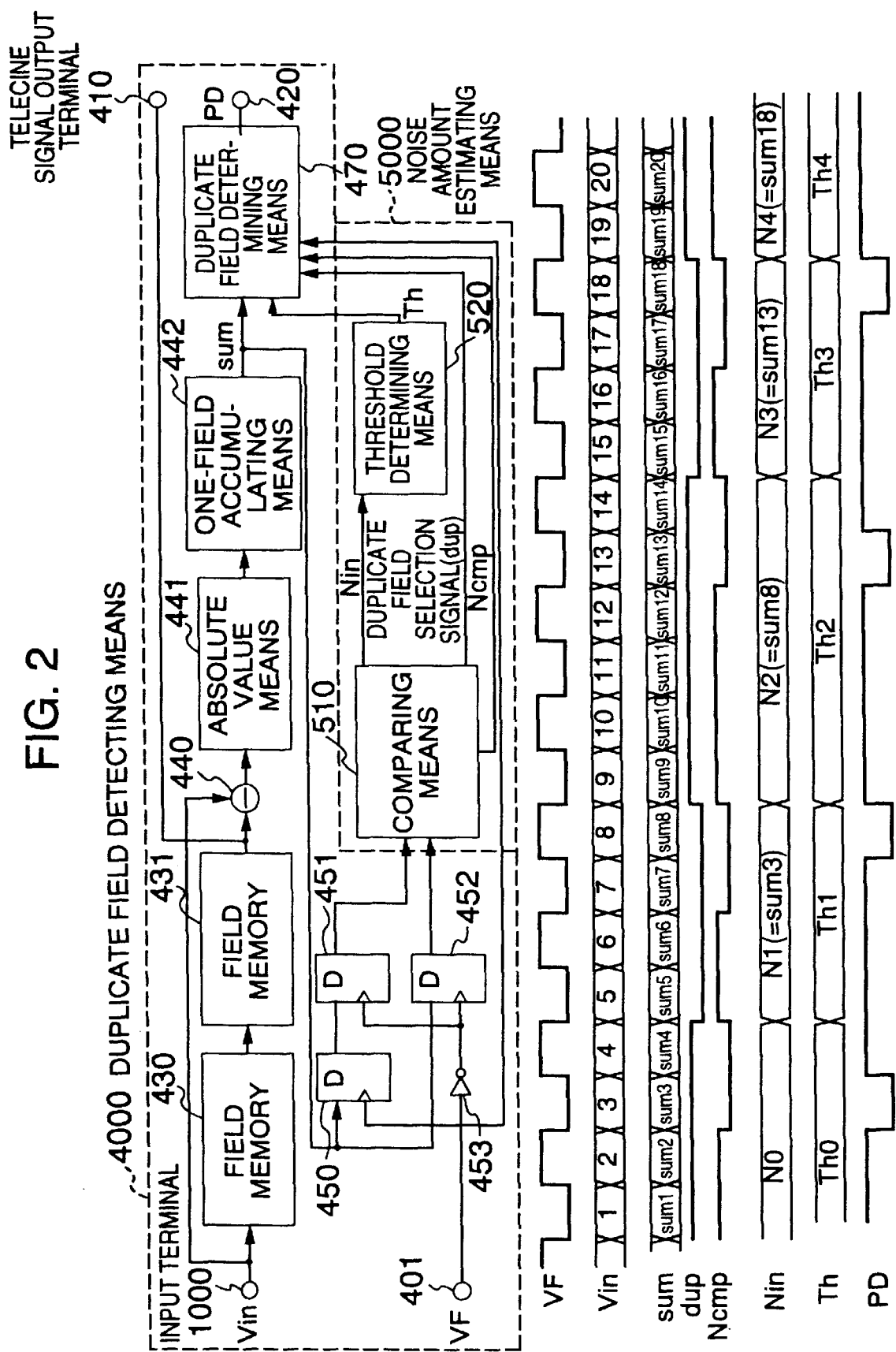
FIG. 2 is a block diagram and timing chart of the noise amount detector in the first embodiment of the invention shown in FIG. 1.

FIG. 2 shows a block diagram of the duplicate field detecting means 4000 and noise amount estimating means 5000, and a timing chart of each signal. Referring to FIG. 2, the telecine signal fed through the input terminal 1000 is supplied directly to a subtracter 440 and also to a series circuit (delaying one frame) of delay means 430 and 431 as field memories. The output from the field memory 431 is fed to the subtracter 440, and also through a telecine signal output terminal 410 to the duplicate field removing means 6000 shown in FIG. 1. The subtracter 440 makes subtraction between the telecine signal (Vin) directly fed from the input terminal 1000 and the output from the delay means, and supplies the difference signal to absolute value means 441, in which its absolute value is produced. The absolute value is supplied to one-field accumulating means 442 where it is accumulated during one field. The output from the one-field accumulating means 442 is supplied to duplicate field determining means 470, and also to D-flip-flops 450 and 452. The accumulated result from the D-flip-flop 450 is fed to a D-flip-flop 451 where timing is adjusted so that the accumulated result of the first field of a frame can be compared with that of the second field of the same frame. A comparing means 510 compares the accumulated results of the first and second fields of the same frame. At this time, the comparing means 510 multiplies the accumulated result of the first field by a coefficient larger than 1, and compares the multiplied result with the accumulated result of the second field. If the compared result is smaller than a predetermined value, the first field is decided to be a duplicate field. In addition, the comparing means multiplies the accumulated result of the second field by a coefficient larger than 1, and compares the multiplied result with the accumulated result of the first field. If the compared result is smaller than a certain value, the second field is decided to be a duplicate field. If each of the compared results in both cases is larger than a certain value, the corresponding field is decided not to be a duplicate field. In FIG. 2, when a duplicate field is present, the comparing means 510 produces a low-level output signal, and when no duplicate field is present, it produces a high-level output signal. This output signal of low or high level is supplied to the duplicate field determining means 470 as a compared output (Ncmp). The comparing means 510 also produces a duplicate field selection signal (dup) which indicates whether the first field or second field of the same frame is duplicate. If the first field is duplicate, the duplicate field selection signal (dup) is turned low level at the next frame and kept low level until a second field of duplication comes. If the second field is duplicate, the duplicate field selection signal (dup) is turned high level at the next frame and kept high level until a first field of duplication comes. This duplicate field selection signal is also supplied to the duplicate field determining means 470. Moreover, the comparing means 510 regards the accumulated result of the detected duplicate field as the amount of noise, Nin, included in the telecine signal, and supplies it to threshold determining means 520. The threshold determining means 520 responds to this amount of noise to determine a threshold (Th) to the duplicate field determining means 470.

The duplicate field determining means 470 receives the compared output (Ncmp) and duplicate field selection signal (dup) from the comparing means 510 and the field alternating signal VF, and makes the first decision that the first field is duplicate when VF=low level, Ncmp=low level and dup=high level, the second field is duplicate when VF=high level, Ncmp=low level and dup=low level, and no duplicate field is present when VF, Ncmp and dup are in the other combinations of high and low levels. The duplicate field determining means 470 also receives the threshold (Th) from the threshold value determining means 520 and the output (sum) from the one-field accumulating means 442, and makes the second decision that the corresponding field is duplicate when the output (sum) is lower than the threshold, but is not duplicate when the output (sum) is larger than the threshold. The duplicate field determining means 470 finally decides from the first and second decisions whether the corresponding field is duplicate or not, and supplies the duplicate field identification signal through an output terminal 420 to the duplicate field removing means 6000 shown in FIG. 1. The duplicate field removing means 6000 responds to this information to produce the duplicate field removed output at the output terminal 2000.

Figure 3:
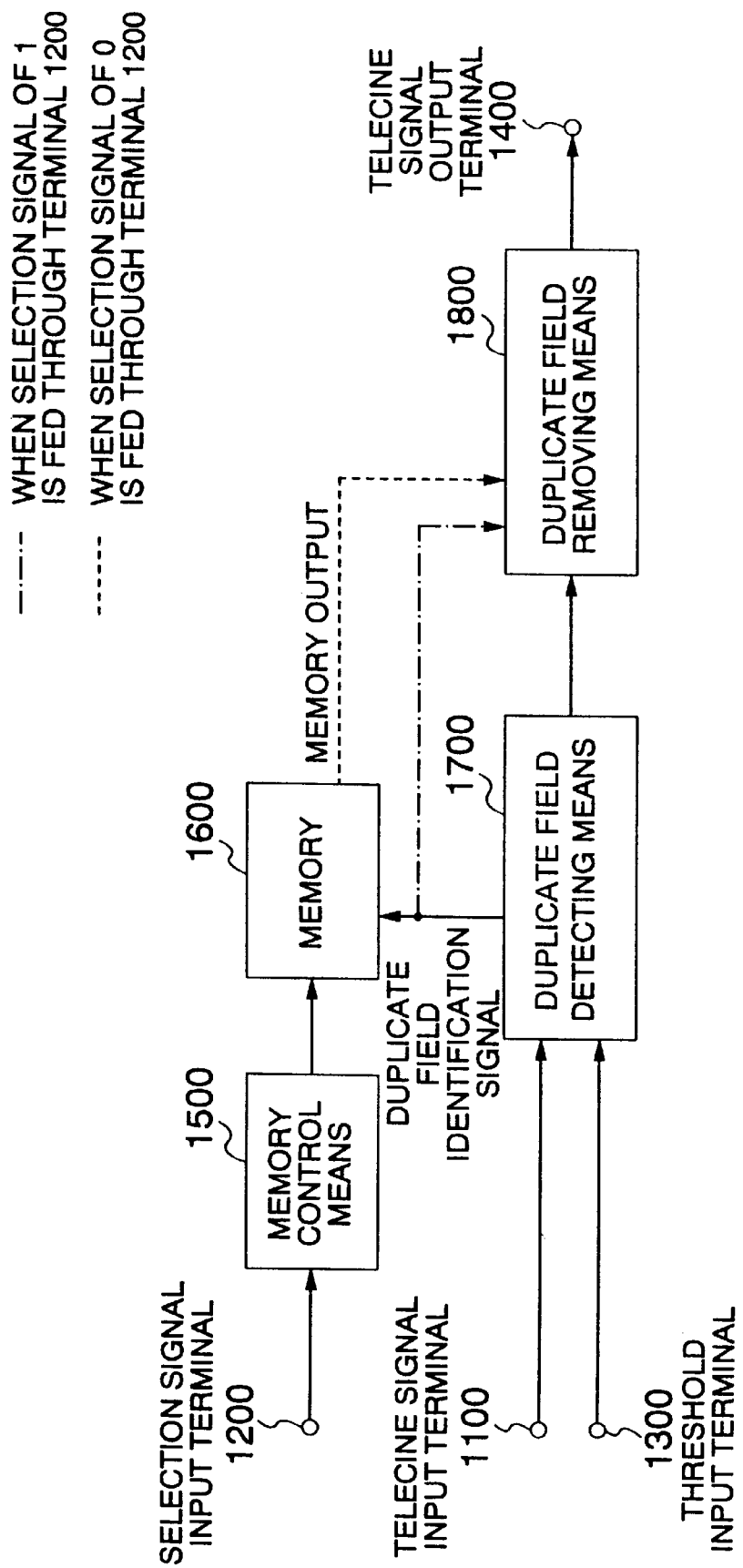
FIG. 3 is a block diagram of the second embodiment of the television signal conversion system according to the present invention.

FIG. 3 is a block diagram of the television signal conversion system of the second embodiment of the invention associated with the object (2) of the invention. Referring to FIG. 3, there are shown an input terminal 1100 through which the telecine signal is supplied to the system, an input terminal 1200 for a selection signal, an input terminal 1300 for a threshold, an output terminal 1400 for the telecine signal, and memory control means 1500. The memory control means 1500 responds to the selection signal fed through the input terminal 1200 to control a memory 1600 to write or read. In FIG. 3, when the selection signal is "1", the memory control means 1500 controls the memory 1600 to write, while when the selection signal is "0", it controls the memory 1600 to read. First, the selection signal of "1" is fed through the input terminal 1200, making the memory 1600 in the write mode. Then, the telecine signal is supplied through the input terminal 1100 to duplicate field detecting means 1700, in which a duplicate field is detected. The duplicate field identification signal produced from the duplicate field detecting means 1700 is stored in the memory 1600, and also supplied to duplicate field removing means 1800, where the duplicate field is removed from the telecine signal according to the identification signal. When the same telecine signal is again supplied through the input terminal, the selection signal of "0" is supplied through the input terminal 1200, making the memory control means 1500 in the read mode. Thus, the signal in the memory 1600 is read out and fed to the duplicate field removing means 1800, causing it to remove the duplicate field from the telecine signal. Thus, the duplicate field removed telecine signal is produced at the output terminal 1400.

Figure 4:
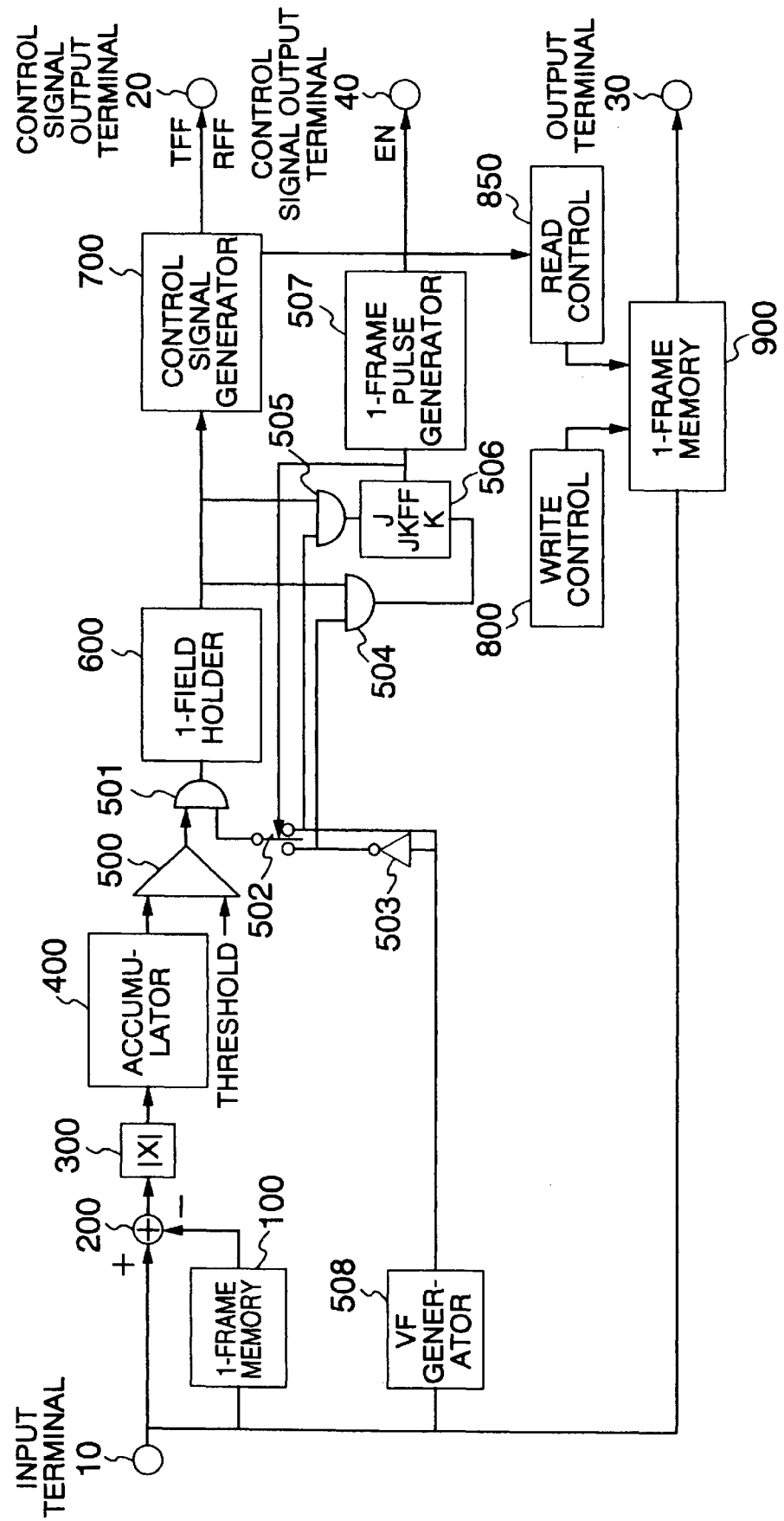
FIG. 4 is a block diagram of the third embodiment of the television signal conversion system according to the present invention.
Figure 11:
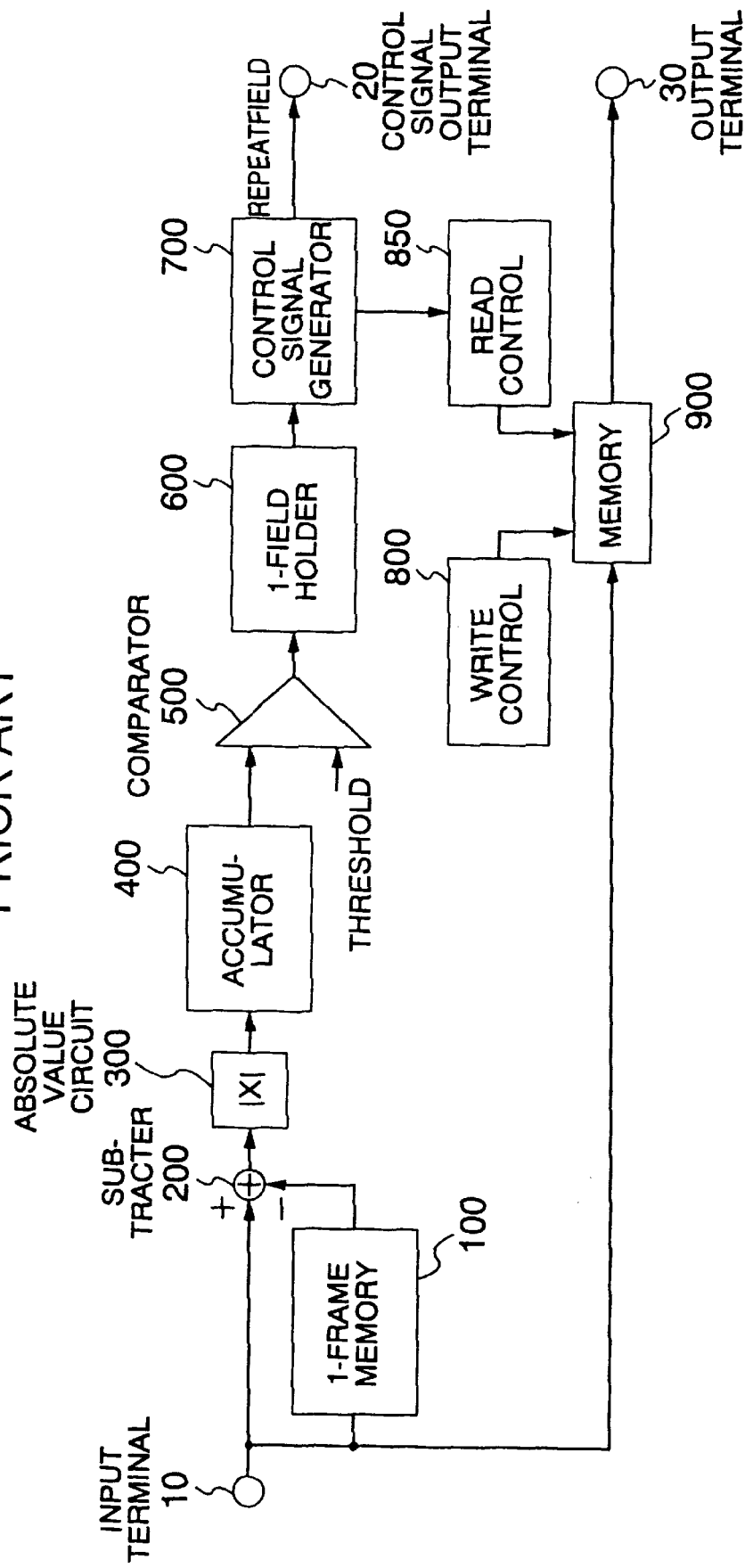
FIG. 11 is a block diagram of the conventional television signal conversion system for detecting duplicate fields.

FIG. 4 is a block diagram of the television signal conversion system of the third embodiment of the invention associated with the objects (3), (4) and (5) of the invention. FIG. 5 is a timing diagram to which reference is made in explaining the operation of the television signal conversion system of the invention shown in FIG. 4. In FIG. 4, like elements corresponding to those in FIG. 11 are identified by the same reference numerals. Also, in FIG. 4, reference numeral 10 represents the input terminal of the system, 30 the output terminal of the system, and 20 and 40 the output terminals for the control signal.

Referring to FIG. 4, there is also shown a VF generating circuit 508 which produces a field alternating signal (VF) indicating whether the telecine image supplied through the input terminal 10 is an even or odd field. In addition, there are shown a change-over switch 502, an inverter 503, OR gates 504 and 505, a JK flip-flop 506, and a one-frame pulse generating circuit 507 for generating a pulse signal of one-frame width when detecting, for example, the leading edge of the input signal. The operation of this embodiment will be mentioned below.

The telecine signal supplied through the input terminal 10 of the system is processed by the frame memory 100, subtracter 200, absolute value circuit 300 and accumulator 400, so that an accumulated result of each field is produced from the accumulator 400. This accumulated result is compared with a threshold in the comparator 500. If the result is larger than the threshold, the corresponding field is decided to be a field of a different frame of the original film. If the result is smaller than the threshold, it is decided to be a duplicate field of the same frame of the original film.

The VF generating circuit 508 generates the field alternating signal synchronized with the input telecine signal. The field alternating signal is supplied to an AND gate 501 through the inverter 503, and selector 502. This signal controls the decision operation of whether a duplication should be detected at an even or odd field. The outputs from AND gates 504 and 505 are supplied to the JK flip-flop 506 in accordance with the decision operation of whether the field detected as a duplication is even-numbered or odd-numbered.

At this time, the logical output from the JK flip-flop 506 is inverted at each duplicate field detection, actuating the selector 502 to switch between the even and odd duplication detecting operations. The one-frame pulse generating circuit 507 responds to the signal from the JK flip-flop 506 to produce a pulse signal of one-frame width. When a duplicate field is detected at each of the even and odd fields, the output of the JK flip-flop 506 is risen up, and a pulse of one-frame width is generated at its leading edge from the JK flip-flop and supplied through the output terminal 40 as a control signal to the following stage.

The duplicate field detected signal produced from the AND gate 501 is held in the hold circuit 600 for one-field period, and then supplied to the control signal generating circuit 700, where the control signal is generated for the telecine image. The frame memory 900 prevents the duplicate fields from being fed to the following stage. By this frame memory, it is possible to remove the duplicate field from the telecine image (30 Hz) and rearrange the fields thereof. The output from the frame memory is supplied through the output terminal 30 of the system to the outside. The write control circuit 800 controls the frame memory 900 to write, and the read control circuit 850 controls the frame memory 900 to read in accordance with the control signal from the control signal generator 700.

Thus, each time a duplicate field is detected, the output level from the JK flip-flop 506 is inverted so that duplication detection operation can always be performed in alternate even and odd fields. FIG. 5 is a timing diagram to which reference is made in explaining the operation of the television signal conversion system of the invention shown in FIG. 4. The operation of each portion in FIG. 4 will be described with reference to FIG. 5.

The telecine signal (FIG. 5A) supplied through the input terminal 10 is fed to the one-frame memory 900, which is then controlled by the read control circuit 850 to remove the duplicate field and rearrange the frames in response to the duplicate field detected result. Thus, the memory 900 produces a converted output (FIG. 5B). The control signals (TopFieldFirst and RepeatFirstField) according to the telecine signal and the signal (EN) for controlling the transmission to the following stage are generated from the control signal generating circuit 700 and one-frame pulse generating circuit 507 and supplied through the output terminals 20 and 40, respectively (FIG. 5C).

Thus, according to the television signal conversion system of the invention associated with the objects (3), (4) and (5), when a duplication is detected in the first field, the duplicate field is removed, and an offset of one frame is given to the first field, while when a duplication is detected in the second field, the duplicate field is removed, and the offset already given to the first fields is removed to leave the original state. That is, the fields of the television signal can be kept continuous.

In addition, when detection and elimination of a duplicate field are made at each of the first and second fields, the output can be stopped during the no-data period left after the elimination, and the clock common to the input telecine signal can be used for the operation of the system. Moreover, even if there is such an irregular conversion pattern that duplications successively occur in even fields or odd fields, a duplication is always detected in alternate even and odd fields, and the transmission of signal to the following stage is inhibited when a duplicate field is detected in each of the even and off fields. Thus, for example, the input telecine signal can always be encoded or transmitted in frame units.

The fourth embodiment of the invention associated with the object (6) of the invention will be described below.

Figure 6:
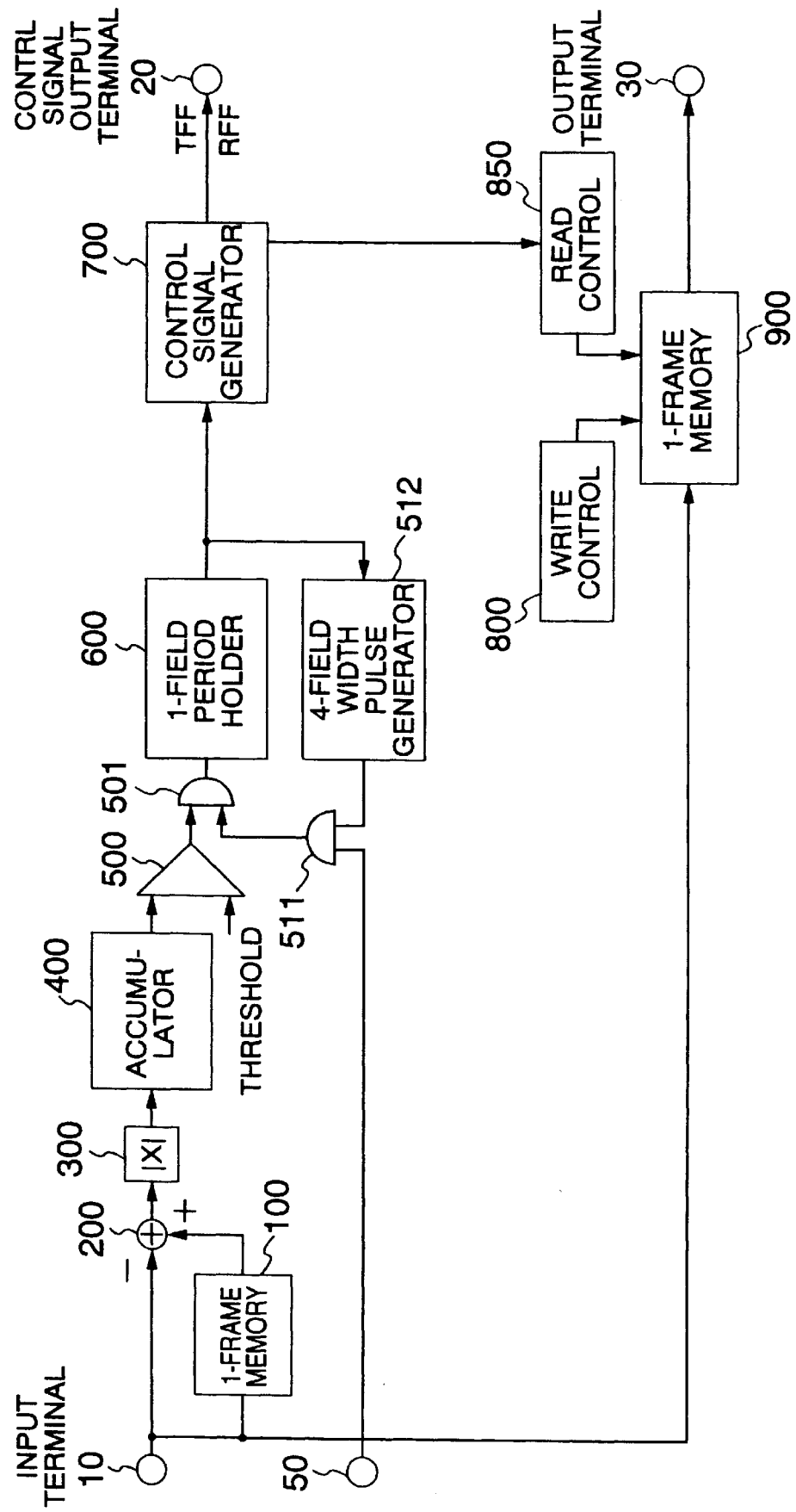
FIG. 6 is a block diagram of the fourth embodiment of the television signal conversion system according to the present invention.

FIG. 6 is a block diagram of the television signal conversion system of the fourth embodiment of the invention associated with the object (6) of the invention. In FIG. 6, like elements corresponding to those in FIG. 11 are identified by the same reference numerals. Referring to FIG. 6, there are shown the input terminal 10 of the system, the output terminal 30 of the system, the output terminal 20 for the control signal, and the input terminal 50 for the control signal. There are also shown AND gates 510 and 511, and a four-field width pulse generating circuit 512 for generating a pulse of four-field width in accordance with either leading edge or trailing edge of the input. The operation of this system will be described.

The telecine signal fed through the input terminal 10 of the system is processed by the frame memory 100, subtracter 200, absolute value circuit 300 and accumulator 400 so that an accumulated result of each field is produced from the accumulator 400. The accumulated result is compared with a threshold in the comparator 500. If it is larger than the threshold, the field is decided to be of a different frame of the original film. If it is smaller than the threshold, the field is decided to be a duplicate field of the same frame of the original film. The four-field width pulse generator 512 produces a pulse of four-field width when a duplicate field is detected. The four-field width pulse is fed through the AND gates 511 and 510, inhibiting any other duplicate fields from being detected during a period of four fields. To the input terminal 50 is applied a control signal for controlling whether duplicate field detection is stopped for a certain period.

The duplicate field detected signal from the AND gate 510 is held for one-field period in the hold circuit 600 and then fed to the control signal generating circuit 700, where a control signal is produced for the telecine image. The frame memory 900 prevents the duplicate fields from being fed to the following stage. The frame memory 900 thus removes the duplicate fields of the telecine signal (30 Hz), and rearranges the fields thereof. The output from the frame memory 900 is supplied through the output terminal 30 to the outside. The write control circuit 800 controls the frame memory 900 to write, and the read control circuit 850 controls the frame memory 900 to read in accordance with the control signal from the control signal generator 700.

Thus, according to the television signal conversion system of the invention associated with the object (6) constructed as above, duplicate field detection is inhibited during a period of four fields each time a duplicate field is detected, and even when a sequence of moving pictures includes frames of still pictures, the duplicate fields can be detected without the detection period disturbed, or can be detected with the same period as in the moving pictures. Therefore, for example, encoding or transmission can be performed by use of the control flags (TopFieldFirst and RepeatFieldFirst) which meet MPEG2 standard.

The fifth embodiment of the invention associated with the object (7) will be described.

Figure 7:
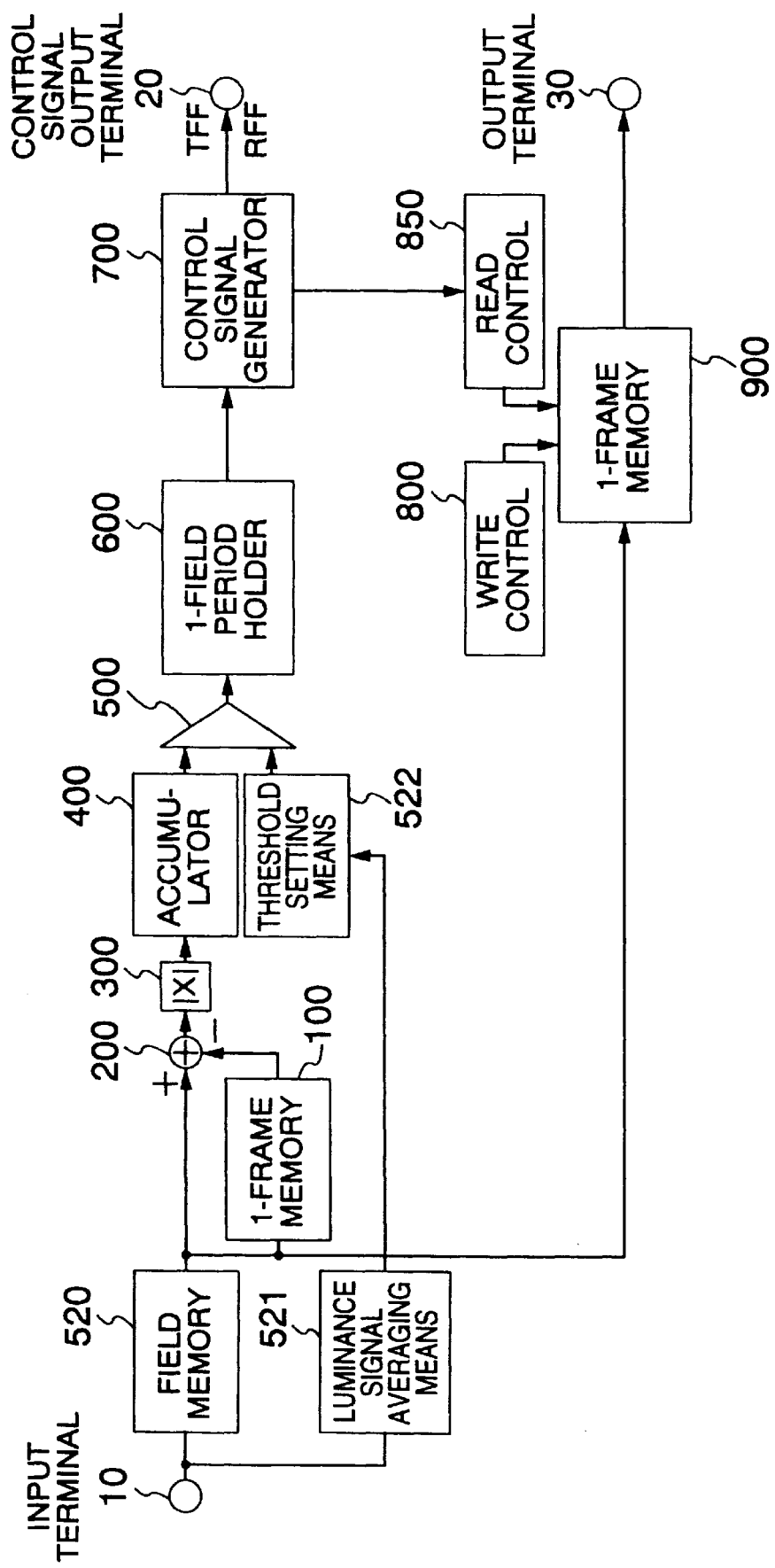
FIG. 7 is a block diagram of the fifth embodiment of the television signal conversion system according to the invention.

FIG. 7 is a block diagram of the television signal conversion system of the invention associated with the object (7). In FIG. 7, like elements corresponding to those in FIG. 11 are identified by the same reference numerals. Referring to FIG. 7, there are shown the input terminal 10, the output terminal 30, the output terminal 20 for control signal, a field memory 520, a luminance signal averaging circuit 521 which is formed of an accumulator or the like and used for measuring the average value of the luminance signal of the input telecine signal, and a threshold setting circuit 522 capable of dynamically changing the threshold. The operation of the fifth embodiment of the invention will be described.

The telecine signal fed through the input terminal 10 is processed by the field memory 520, frame memory 100, subtracter 200, absolute value circuit 300 and accumulator 400 so that an accumulated result of each field unit can be produced from the accumulator 400. The accumulated result is compared with a threshold in the comparator 500. If it is larger than the threshold, the field is decided to be a field of a different frame of the original film. If it is smaller than the threshold, the field is decided to be a duplicate field of the same frame of the original film.

The telecine signal fed through the input terminal 10 is also supplied to the luminance signal averaging circuit 521, which then calculates the average value of the luminance signal within a field. The average value of the luminance signal is supplied to the threshold setting circuit 522, where the threshold value is set to be a low value if the average value is high, but to a high value if the average value is low. The duplicate field detected signal from the comparator 500 is held for a period of one field in the hold circuit 600, and then fed to the control signal generating circuit 700, where a control signal is generated for the telecine image.

The frame memory 900 prevents the duplicate fields from being fed to the following stage. In other words, the frame memory 900 removes the duplicate fields of the telecine signal (30 Hz) and rearranges the fields thereof. The output from the frame memory 900 is supplied through the output terminal 30 to the outside. The write control circuit 800 controls the frame memory 900 to write, and the read control circuit 850 controls the frame memory 900 to read in accordance with the control signal from the control signal generating circuit 700.

Thus, according to the television signal conversion system of the invention associated with the object (7) constructed as above, the duplicate decision threshold is set to a high value if the average value of the luminance signal is high, but to a low value if the average value is low. Thus, even when the film images include much noise as photographed in a dark place, the duplicate fields of the input telecine image can be detected without the effect of noise.

Another embodiment associated with the object (7) will be mentioned.

Figure 8:
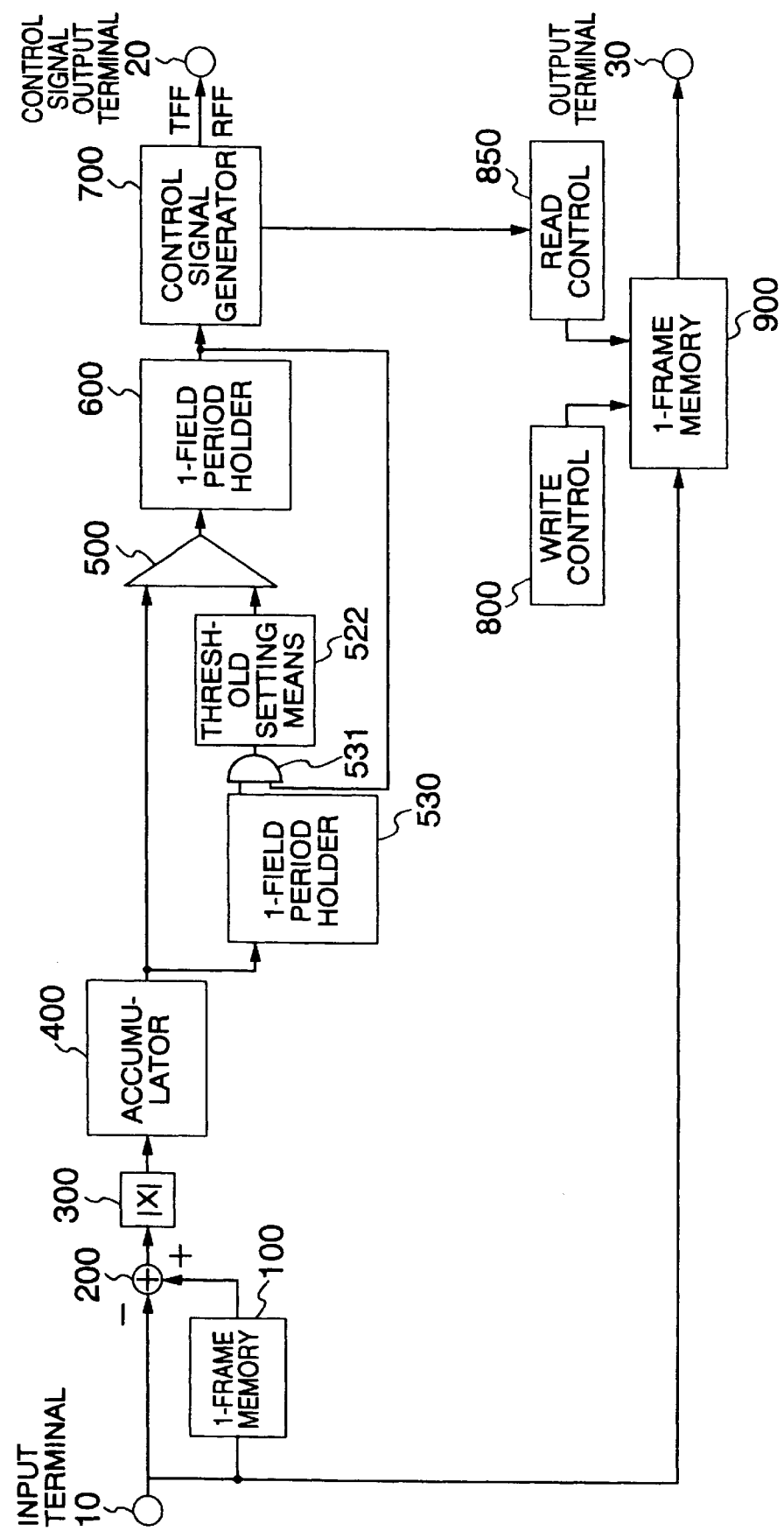
FIG. 8 is a block diagram of the sixth embodiment of the television signal conversion system according to the invention.

FIG. 8 is a block diagram of the television signal conversion system of the sixth embodiment of the invention associated with the object (7). In FIG. 8, like elements corresponding to those in FIG. 11 are identified by the same reference numerals. Referring to FIG. 8, there are shown the input terminal 10, the output terminal 30, the control signal output terminal 20, a one-field hold circuit 530 for holding the accumulated result for a period of one field, an AND gate 531, and the threshold setting circuit 522 capable of dynamically changing the threshold. The operation of the sixth embodiment of the invention will be described.

The telecine signal fed through the input terminal 10 is processed by the frame memory 100, subtracter 200, absolute value circuit 300 and accumulator 400 so that an accumulated result of each field unit is produced from the accumulator 400. The accumulated result is compared with a threshold in the comparator 500. If it is larger than the threshold, the field is decided to be a field of a different frame of the original film. If it is smaller than the threshold, the field is decided to be a duplicate field of the same frame of the original film. The accumulated result from the accumulator 400 is also supplied through the hold circuit 530 and the AND gate 531 to the threshold setting circuit 522.

The AND gate 531 controls only the accumulated result of a definite duplicate field to be sent to the threshold setting circuit 522. The threshold setting circuit 522 receives the accumulated result of the definite duplicate field, and sets the threshold to be a high value when the result is large, but to a low value when the result is small.

The duplicate field detected signal from the comparator 500 is held for a period of one field in the hold circuit 600, and then fed to the control signal generating circuit 700, where a control signal for the telecine image is generated. The frame memory 900 prevents the duplicate fields from being fed to the following stage. That is, the frame memory 900 removes the duplicate fields of the telecine images and rearranges the fields thereof, and supplies the rearranged signal through the output terminal 30 to the outside. The write control circuit 800 controls the frame memory 900 to write, and the read control circuit 850 controls the frame memory 900 to read in accordance with the control signal from the control signal generating circuit 700.

Thus, according to the television signal conversion system of the sixth embodiment of the invention associated with the object (7) constructed as above, the threshold is set to a high value even when the interframe difference value relative to a duplicate field becomes large due to the effect of noise or the like. Therefore, the duplicate fields of the input telecine signal having much noise can be surely detected.

The seventh embodiment of the invention associated with the object (8) will be described.

Figure 9:
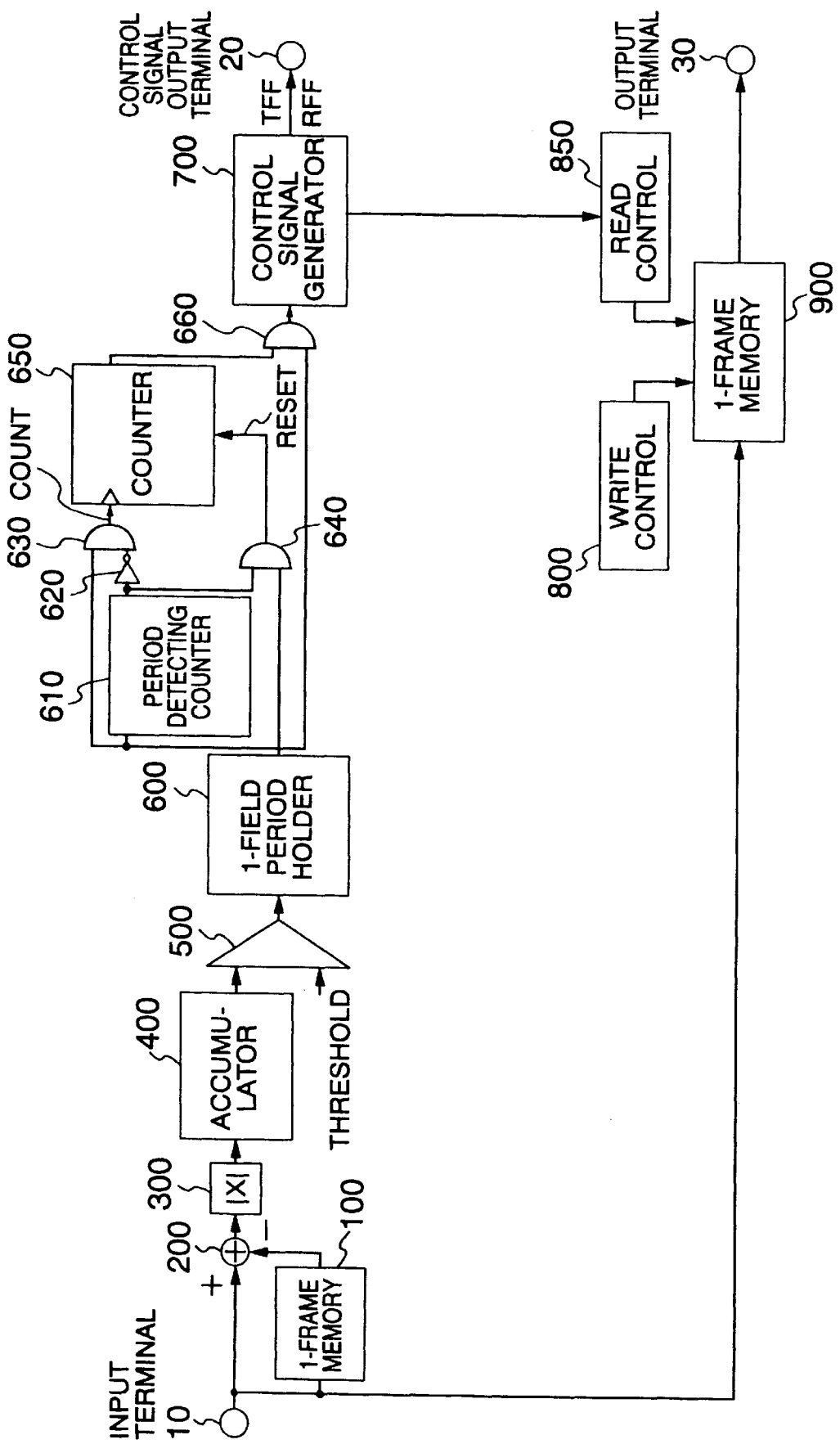
FIG. 9 is a block diagram of the seventh embodiment of the television signal conversion system according to the invention.
Figure 10:
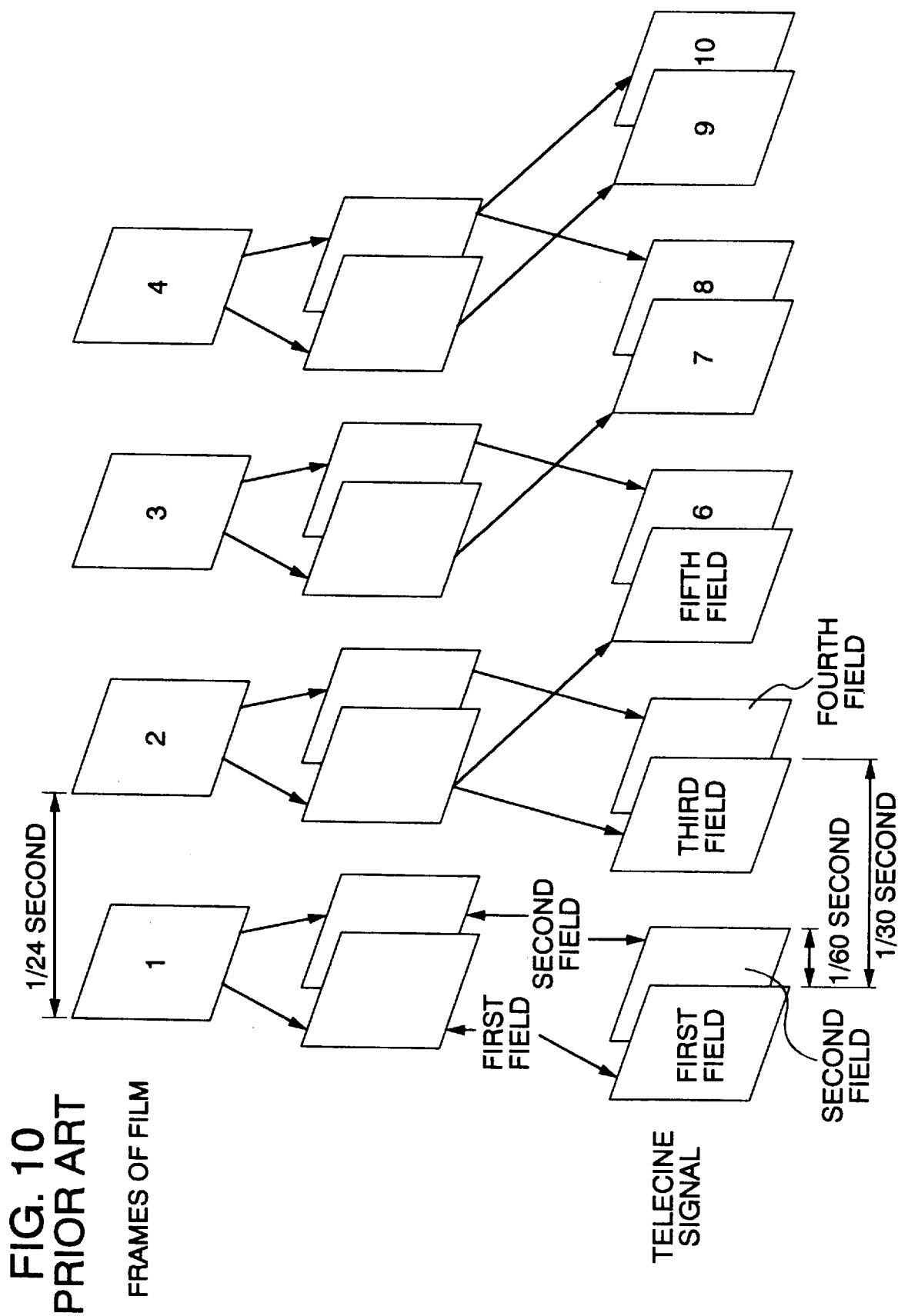
FIG. 10 is a diagram useful for explaining the principle of the 2–3 pull down system.

FIG. 9 is a block diagram of the television signal conversion system of the invention associated with the object (8). In FIG. 9, like elements corresponding to those in FIG. 11 are identified by the same reference numerals. Referring to FIG. 9, there are shown the input terminal 10, the output terminal 30, the control signal output terminal 20, a period detecting counter 610 for measuring the interval of duplicate fields, an inverter 620, AND gates 630, 640 and 660, and a counter 650 for counting only when the duplicate fields are successively detected at certain intervals. The operation of the seventh embodiment of the invention will be described below.

The telecine signal fed through the input terminal 10 is processed by the frame memory 100, subtracter 200, absolute value circuit 300, and accumulator 400 so that an accumulated result of each field unit can be produced from the accumulator 400. The accumulated result is compared with a threshold in the comparator 500. If it is larger than the threshold, the field is decided to be a field of a different frame of the original film. If it is smaller than the threshold, the field is decided to be a duplicate field of the same frame of the original film. The duplicate field detected result is supplied through the hold circuit 600 to the period detecting counter 610, which then counts the period relative to the previous duplicate field detected result.

The period detecting counter 610 is constructed so that the output level turns Lo level only when the counted period is, for example, five fields (when the 24 Hz film is converted into the telecine signal). Therefore, if the period of the duplicate fields is not five fields, the AND gate 640 produces a pulse each time a duplicate field is detected, thus resetting the counter 650. Only when the period of the duplicate fields is five fields, the AND gate 630 produces a pulse each time a duplicate field is detected, thus causing the counter 650 to count up.

The counter 630 counts the number of duplicate fields successively fed with the period of five fields. When it counts a certain number, the output level is changed from Lo to Hi. At this time, the duplicate field detected result is produced from the AND gate 660, and actuates the control signal generator 700 to generate the control signal for the telecine image. The frame memory 900 prevents the duplicate fields from being fed to the following stage. In other words, the frame memory 900 removes the duplicate fields of the telecine signal (30 Hz) and rearranges the fields thereof. The output from the frame memory 900 is supplied through the output terminal 30 to the outside. The write control circuit 800 controls the frame memory 900 to write, and the read control circuit 850 controls the frame memory 900 to read in accordance with the control signal from the control signal generating circuit 700.

Thus, according to the seventh embodiment of the invention associated with the object (8) constructed as above, the independent fields and the duplicate fields can be surely discriminated even if the telecine signal having a different frame rate from the original film includes noise. Therefore, for example, the encoding or transmission can be performed with high efficiency.

What is claimed is:

1. A television signal conversion system for receiving a television signal having a duplicate field, and for detecting and removing said duplicate field, said system comprising:

duplicate field detecting means for detecting said duplicate field in accordance with a duplication decision criterion to derive a detected result;

duplicate field removing means for removing said duplicate field in accordance with the detected result from said duplicate field detecting means;

noise amount estimating means for estimating an amount of noise included in said television signal to derive an estimated result; and duplication decision criterion controlling means for controlling said duplication decision criterion in accordance with the estimated result from said noise amount estimating means.

2. A television signal conversion system according to claim 1, wherein said television signal comprises a plurality of frames, each with a first field and a second field, and said duplicate field detecting means comprises:

interframe correlation calculating means for calculating an interframe correlation value between adjacent ones of said frames of said television signal; and detecting means for comparing a predetermined threshold with a ratio between said interframe correlation value calculated on said first fields of said adjacent frames and said interframe correlation value calculated on said second fields of said adjacent frames.

3. A television signal conversion system according to claim 2 wherein said noise amount estimating means is constructed so to estimate the amount of noise by use of a correlation between said duplicate field and another duplicate field when said duplicate field is detected by said duplicate field detecting means.

4. A television signal conversion system according to claim 3 wherein said noise amount estimating means is constructed so to estimate the amount of noise by use of said interframe value of said television signal in said duplicate field detected by said duplicate field detecting means.

5. A television signal conversion system according to claim 3 wherein said duplicate field detecting means or said noise amount estimating means makes calculation for duplicate field detection or noise amount estimation by use of only a luminance signal component of said television signal.

6. A television signal conversion system according to claim 2 wherein said noise amount estimating means is constructed so to estimate the amount of noise by use of said interframe correlation value of said television signal in said duplicate filed detected by said duplicate filed detecting means.

7. A television signal conversion system according to claim 2 wherein said duplicate field detecting means further comprises:

interframe difference value calculating means for calculating an interframe difference value between said adjacent frames of said television signal;

absolute value calculating means for calculating an absolute value of said interframe difference value;

accumulating means for obtaining an accumulated result by accumulating said absolute value every one field period, said field constituting said television signal; and first detecting means for detecting said duplicate field by comparing said accumulated result with a predetermined positive threshold;

holding means for holding a first accumulated result and second accumulated result during a period of one frame of said television signal, said first and second accumulated results being obtained on first and second fields of said adjacent frames in said accumulating means, respectively;

first comparing means for comparing said second accumulated result with a first value obtained by multiplying said first accumulated result and a coefficient k larger than 1;

second comparing means for comparing said first accumulated result with a second value obtained by multiplying said second accumulated result and said coefficient k; and second detecting means for deciding that said first field is said duplicate field when said first value is decided to be smaller in said first comparing means, and that said second field is said duplicate field when said second value is decided to be smaller in said second comparing means.

8. A television signal conversion system according to claim 2 wherein said duplicate field detecting means or said noise amount estimating means makes calculation for duplicate field detection or noise amount estimation by use of only a luminance signal component of said television signal.

9. A television signal conversion system according to claim 1, wherein said television signal comprises a plurality of frames, each with a first field and a second field, and said duplicate field detecting means comprises:

interframe difference value calculating means for calculating an interframe difference value between adjacent ones of said frames of said television signal;

absolute value calculating means for calculating an absolute value of said interframe difference value;

accumulating means for obtaining an accumulated result by accumulating said absolute value every one field period; and detecting means for detecting said duplicate field by comparing a predetermined threshold with a ratio between said accumulated result obtained on said first fields of said adjacent frames and said accumulated result obtained on said second fields of said adjacent frames.

10. A television signal conversion system according to claim 9 wherein said duplicate field detecting means further comprises:

first detecting means for detecting said duplicate field by comparing said accumulated result with a predetermined positive threshold;

holding means for holding a first accumulated result and second accumulated result during a period of one frame of said television signal, said first and second accumulated results being obtained on first and second fields of said adjacent frames in said accumulating means, respectively;

first comparing means for comparing said second accumulated result with a first value obtained by multiplying said first accumulated result and a coefficient k larger than 1;

second comparing means for comparing said first accumulated result with a second value obtained by multiplying said second accumulated result and said coefficient k; and second detecting means for deciding that said first field is said duplicate field when said first value is decided to be smaller in said first comparing means, and that said second field is said duplicate field when said second value is decided to be smaller in said second comparing means.

11. A television signal conversion system according to claim 9 wherein said noise amount estimating means is constructed so to estimate the amount of noise by se of said interframe correlation value of said television signal in said duplicate field detected by said duplicate field detecting means.

12. A television signal conversion system according to claim 9 wherein said duplicate filed detecting means or said noise amount estimating means makes calculation for duplicate field detection or noise amount estimation by use of only a luminance signal component of said television signal.

13. A television signal conversion system for receiving a television signal having a duplicate field, and for detecting and removing said duplicate field, said system comprising:

duplicate field detecting means for detecting said duplicate field;

duplicate field removing means for removing said duplicate field detected in said duplicate field detecting means; and frame determining means for determining two fields which constitute a frame of said television signal, wherein:

when said duplicate field is detected in said duplicate field detecting means, said duplicate field removing means removes said duplicate field and said frame determining means determines a new frame of said television signal by use of two successive fields occurring after said duplicate field removed in said duplicate field removing means and said new frame is transmitted and encoded, and said duplicate field detecting means is formed of said duplicate field detecting means described in claim 9.

14. A television signal conversion system according to claim 1, wherein said television signal comprises a plurality of frames, each with a first field and a second field, and said duplicate field detecting means comprises:

interframe difference value calculating means for calculating an interframe difference value between adjacent ones of said frames of said television signal;

absolute value calculating means for calculating an absolute value of said interframe difference value;

accumulating means for obtaining an accumulated result by accumulating said absolute value every one field period;

first detecting means for detecting said duplicate field by comparing said accumulated result with a predetermined positive threshold; and second detecting means for detecting said duplicate field by comparing a predetermined threshold with a ratio between said accumulated result obtained on said first fields of said adjacent frames and said accumulated result obtained on said second fields of said adjacent frames.

15. A television signal conversion system according to claim 14 wherein said duplicate field detecting means is constructed so that said threshold used for comparing with said accumulated results of said interframe difference values to detect said duplicate field is a value which monotonously increases in accordance with said estimated result from said noise amount estimating means.

16. A television signal conversion system according to claim 14 wherein said duplicate field detecting means is constructed so that said threshold used for comparing with said accumulated results of said interframe difference values to detect said duplicate field is a value which is obtained by adding said estimated result of said noise amount estimating means to a predetermined reference value.

17. A television signal conversion system according to claim 14 wherein said duplicate field detecting means is constructed so that said threshold used for comparing with said accumulated results of said interframe difference values to detect said duplicate field is a value which is obtained as a linear function with a first value as an intercept and with a second value as a gradient according to said estimated result of said noise amount estimating means, said second value being decreased with an increase of said estimated result.

18. A television signal conversion system according to claim 14 wherein said duplicate field detecting means is constructed so that said threshold used for comparing with said accumulated results of said interframe difference values to detect said duplicate field is a value which monotonously increases in accordance with said estimated result from said noise amount estimating means when said estimated result is less than a predetermined positive value, but is fixed when said estimated result exceeds the predetermined positive value.

19. A television signal conversion system according to claim 14 wherein said duplicate field detecting means is constructed so that said threshold used for comparing with said accumulated results of said interframe difference values to detect said duplicate field is set in accordance with a brightness of a luminance signal of said television signal.

20. A television signal conversion system according to claim 14 wherein said duplicate field detecting means further comprises:

first detecting means for detecting said duplicate field by comparing said accumulated result with a predetermined positive threshold;

holding means for holding a first accumulated result and second accumulated result during a period of one frame of said television signal, said first and second accumulated results being obtained on first and second fields of said adjacent frames in said accumulating means, respectively;

first comparing means for comparing said second accumulated result with a first value obtained by multiplying said first accumulated result and a coefficient k larger than 1;

second comparing means for comparing said first accumulated result with a second value obtained by multiplying said second accumulated result and said coefficient k; and second detecting means for deciding that said first field is said duplicate field when said first value is decided to be smaller in said first comparing means, and that said second field is said duplicate field when said second value is decided to be smaller in said second comparing means.

21. A television signal conversion system according to claim 14 wherein said noise amount estimating means is constructed so to estimate the amount of noise by use of said interframe correlation value of said television signal in said duplicate field detected by said duplicate field detecting means.

22. A television signal conversion system according to claim 14 wherein said duplicate filed detecting means or said noise amount estimating means makes calculation for duplicate field detection or noise amount estimation by use of only a luminance signal component of said television signal.

23. A television signal conversion system for receiving a television signal having a duplicate field, and for detecting and removing said duplicate field, said system comprising:
   duplicate field detecting means for detecting said duplicate field;
   duplicate field removing means for removing said duplicate field detected in said duplicate field detecting means; and frame determining means for determining two fields which constitute a frame of said television signal, wherein:
      when said duplicate field is detected in said duplicate field detecting means, said duplicate field removing means removes said duplicate field and said frame determining means determines a new frame of said television signal by use of two successive fields occurring after said duplicate field removed in said duplicate field removing means and said new frame is transmitted and encoded, and
      said duplicate field detecting means is formed of said duplicate field detecting means described in claim 14.

24. A television signal conversion system according to claim 1 wherein said television signal comprises a plurality of frames, each with a first field and a second field, and said duplicate field detecting means comprises:
   interframe difference value calculating means for calculating an interframe difference value between adjacent ones of said frames of said television signal;
   absolute value calculating means for calculating an absolute value of said interframe difference value;
   accumulating means for obtaining an accumulated result by accumulating said absolute value every one field period; and
   first detecting means for detecting said duplicate field by comparing said accumulated result with a predetermined positive threshold;
   holding means for holding a first accumulated result and second accumulated result during a period of one frame of said television signal, said first and second accumulated results being obtained on said first and said second fields of said adjacent frames in said accumulating means, respectively;
   first comparing means for comparing said second accumulated result with a first value obtained by multiplying said first accumulated result and a coefficient k larger than 1;
   second comparing means for comparing said first accumulated result with a second value obtained by multiplying said second accumulated result and said coefficient k; and
   second detecting means for deciding that said first field is said duplicate field when said first value is decided to be smaller in said first comparing means, and that said second field is said duplicate field when said second value is decided to be smaller in said second comparing means.

25. A television signal conversion system according to claim 1 wherein said duplicate field detecting means or said noise amount estimating means makes calculation for duplicate field detection or noise amount estimation by use of only a luminance signal component of said television signal.

26. An image encoding system comprising:
   a television conversion system according to claim 1;
   means for forming a moving picture signal, which can be recorded on recording media, by adding an error correction code to a converted television signal converted in said television conversion system to modulate said converted television signal.

27. A television signal conversion system for receiving a television signal having a duplicate field, and for detecting and removing said duplicate field, said system comprising:
   duplicate field detecting means for detecting said duplicate field to generate a duplicate field identification information;
   storage means for storing said duplicate field identification information;
   storage control means for controlling said storage means to write and read said duplicate field identification information; and
   duplicate field removing means for removing said duplicate field; wherein
      when a new sequence of said television signal is supplied to said system, said duplicate field identification information generated in said duplicate field detecting means is stored in said storage means; and
      when an additional sequence of said television signal which is same as said new sequence is supplied to said system said duplicate field detecting means does not detect said duplicate field, and, said duplicate field removing means removes said duplicate field by reading said duplicate field identification information stored in said storage means.

28. A television signal conversion system according to claim 27, wherein said duplicate field identification information stored in said storage means is either a time information indicating a time of an occurrence of said duplicate field or a relative time information indicating a time interval from a start of said television signal input to said system to the time of the occurrence of said duplicate field.

29. An image encoding system comprising:
   a television conversion system according to claim 27,;
   means for forming a moving picture signal, which can be recorded on recording media, by adding an error correction code to a converted television signal converted in said television conversion system to modulate said converted television signal.

30. A television signal conversion system for receiving a television signal having a duplicate field, and for detecting and removing said duplicate field, said system comprising:
   duplicate field detecting means for detecting said duplicate field;
   duplicate field removing means for removing said duplicate field detected in said duplicate field detecting means; and
   frame determining means for determining two fields which constitute a frame of said television signal, wherein:

when said duplicate field is detected in said duplicate field detecting means, said duplicate field removing means removes said duplicate field and said frame determining means determines a new frame of said television signal by use of two successive fields occurring after said duplicate field removed in said duplicate field removing means and said new frame is transmitted and encoded, said frame determining means comprises:
  storage means for storing at least one frame of said television signal; and
  control means for controlling said storage means to read said at least one frame in accordance with said detection result in said duplicate field detecting means, said control means controlling said storage means to read said at least one frame so that when a first duplicate field on a first field side of a frame forming said television signal is detected, said first duplicate field is removed, and after detecting said first duplicate field, an offset of one frame period is given only on a first field side of said signal; and
  when a second duplicate field on a second field side of said frame forming said television signal is detected, said second duplicate field is removed, and said offset given on said first field side is removed to leave an original state of said signal.

31. A television signal conversion system according to claim 17, wherein
said first field is an even or odd field of said television signal and said second field is an odd or even field of said television signal.

32. A television signal conversion system for receiving a television signal having a duplicate field, and for detecting and removing said duplicate field, said system comprising:
  duplicate field detecting means for detecting said duplicate field;
  duplicate field removing means for removing said duplicate field detected in said duplicate field detecting means; and
  frame determining means for determining two fields which constitute a frame of said television signal, wherein:
    when said duplicate field is detected in said duplicate field detecting means, said duplicate field removing means removes said duplicate field and said frame determining means determines a new frame of said television signal by use of two successive fields occurring after said duplicate field removed in said duplicate field removing means and said new frame is transmitted and encoded, and
    said duplicate field detecting means is constructed so that even and odd fields of said television signal are alternately detected.

33. A television signal conversion system for receiving a television signal having a duplicate field, and for detecting and removing said duplicate field, said system comprising:
  duplicate field detecting means for detecting said duplicate field;
  duplicate field removinq means for removing said duplicate field detected in said duplicate field detecting means: and frame determining means for determining two fields which constitute a frame of said television signal, wherein:
    when said duplicate field is detected in said duplicate field detecting means, said duplicate field removing means removes said duplicate field and said frame determining means determines a new frame of said television signal by use of two successive fields occurring after said duplicate field removed in said duplicate field removing means and said new frame is transmitted and encoded, and
    said duplicate field detecting means is constructed so that after said duplicate field is once detected, said duplicate field detecting means stops the detection during a certain number of following fields.

34. A television signal conversion system according to claim 32, wherein said duplicate field detecting means is constructed so that after said duplicate field is once detected, said duplicate field detecting means stops detection during four following fields.

35. A television signal conversion system according to claim 32, wherein said duplicate field detecting means is constructed so that after said duplicate field is once detected, said duplicate field detecting means stops detection during four following fields.

36. A television signal conversion system for receiving a television signal having a duplicate field, and for detecting and removing said duplicate field, said system comprising:
  duplicate field detecting means for detecting said duplicate field;
  duplicate field removing means for removing said duplicate field detected in said duplicate field detecting means; and
  frame determining means for determining two fields which constitute a frame of said television signal, wherein:
    when said duplicate field is detected in said duplicate field detecting means, said duplicate field removing means removes said duplicate field and said frame determining means determines a new frame of said television signal by use of two successive fields occurring after said duplicate field removed in said duplicate field removing means and said new frame is transmitted and encoded, and
    said duplicate field detecting means comprises:
      interframe correlation calculating means for calculating an interframe correlation value between adjacent ones of said frames of said television signal; and
      detecting means for comparing a predetermined threshold with a ratio between said interframe correlation value calculated on said first fields of said adjacent frames and said interframe correlation value calculated on said second fields of said adjacent frames.

37. A television signal conversion system for receiving a television signal having a duplicate field, and for detecting and removing said duplicate field, said system comprising:
  duplicate field detecting means for detecting said duplicate field;
  duplicate field removing means for removing said duplicate field detected in said duplicate field detecting means; and
  frame determining means for determining two fields which constitute a frame of said television signal, wherein:
    when said duplicate field is detected in said duplicate field detecting means, said duplicate field removing means removes said duplicate field and said frame determining means determines a new frame of said television signal by use of two successive fields occurring after said duplicate field removed in said duplicate field removing means and said new frame is transmitted and encoded, and said television signal conversion system further comprises:
  period detecting means for detecting a periodicity or phase of a detected result of said duplicate field detecting means; and
  control means for controlling said television signal conversion system in accordance with a detected result of said period detecting means.

38. A television signal conversion system according to claim 37, wherein when the detected periodicity or phase is disturbed, said television signal comprises a plurality of frames, each with a first field and a second field, and said television signalincluding said duplicate field is transmitted and encoded until the detected periodicity or phase is stabilized.

39. A television signal conversion system according to claim 37, wherein
  said period detecting means comprises a counter having a five field period so that said counter is reset when said duplicate field is detected and produces a flag at every five fields after said reset; and
  said period detecting means detects said periodicity or phase of said duplicate field on the basis of a logic product of said flag from said counter and a signal indicating detection of said duplicate field.

40. A television signal conversion system for receiving a television signal having a duplicate field, and for detecting and removing said duplicate field, said television signal comprises a plurality of frames, each with a first field and a second field, and said system comprising:
  duplicate field detecting means for detecting said duplicate field which is repeated in said television signal to produce a result;
  storage means for storing at least one frame of said television signal; and
  control means for controlling said storage means to read said at least one field, on the basis of the result in said duplicate field detecting means; wherein
    said control means controls said storage means to read said at least one frame so that when at least one duplicate field is detected on each of said first and second fields, said control means generates a data valid signal indicating whether or not a lack of data is caused by removing said duplicate field, and thereby stops said television signal from being encoded or transmitted to stop a data processing during a data period in which the lack of data is caused by removing said duplicate field.

41. An image encoding system comprising:
a television conversion system according to claim 40;
means for forming a moving picture signal, which can be recorded on recording media, by adding an error correction code to a converted television signal converted in said television conversion system to modulate said converted television signal.

42. An image encoding system for receiving a television signal having a duplicate field, and for transmitting and encoding said television signal after detecting and removing said duplicate field, said television signal comprises a plurality of frames, each with a first field and a second field, and said system comprising:
  duplicate field detecting means for detecting said duplicate field which is repeated in said television signal to produce a result;
  storage means for storing at least one frame of said television signal; and
  control means for controlling said storage means to read said at least one frame, on the basis of the result in said duplicate field detecting means; wherein
    said control means controls said storage means to read said at least one frame so that when at least one duplicate field is detected on each of first and second fields, said control means stops encoding said television signal during one frame period to stop a data processing during a data period in which a lack of data is caused by removing said duplicate field.

43. An image decoding system for decoding a transmitted television signal having a duplicate field in said transmitted signal, said television signal comprises a plurality of frames, each with a first field and a second field, and said system comprising:
  means for stopping decoding said television signal during one frame period when at least one duplicate field is inserted on each of first and second fields; and
  means for stopping a decoding process during a period in which there are surplus data by inserting said duplicate field.

* * * * *